United States Patent
Liu et al.

(10) Patent No.: US 10,405,366 B1
(45) Date of Patent: Sep. 3, 2019

(54) COORDINATED BEAMFORMING

(71) Applicant: Amazon Technologies, Inc., Seattle, WA (US)

(72) Inventors: Jungtao Liu, Saratoga, CA (US); Varada Gopalakrishnan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 15/278,485

(22) Filed: Sep. 28, 2016

(51) Int. Cl.
*H04W 76/15* (2018.01)
*H04L 29/12* (2006.01)
*H04W 24/02* (2009.01)
*H04W 88/08* (2009.01)
*H04W 84/12* (2009.01)

(52) U.S. Cl.
CPC ........ *H04W 76/15* (2018.02); *H04L 61/6022* (2013.01); *H04W 24/02* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 8,780,743 B2 * | 7/2014 | Sombrutzki | ........ | H04W 16/10 370/252 |
| 9,220,007 B2 * | 12/2015 | Remaker | ........... | H04L 63/0421 |
| 9,832,808 B2 * | 11/2017 | Pazhyannur | ........ | H04W 76/046 |
| 9,912,588 B2 * | 3/2018 | Barrett | .................. | H04W 76/15 |
| 2013/0294288 A1 * | 11/2013 | Choi | .................... | H04L 47/745 370/254 |
| 2015/0270877 A1 * | 9/2015 | Hessler | ................. | H04B 7/024 370/329 |
| 2015/0288427 A1 * | 10/2015 | Wang | ................ | H04W 72/1273 370/329 |
| 2016/0029226 A1 * | 1/2016 | Aboul-Magd | ........ | H04W 16/28 370/329 |
| 2017/0163315 A1 * | 6/2017 | Wu | ........................ | H04B 7/024 |
| 2017/0188204 A1 * | 6/2017 | Kela | ....................... | H04W 4/08 |
| 2017/0188279 A1 * | 6/2017 | Chaudhuri | ............. | H04B 7/024 |
| 2017/0195035 A1 * | 7/2017 | Calcev | ................. | H04B 7/0452 |
| 2017/0339672 A1 * | 11/2017 | Tajima | ............. | H04W 74/0808 |

* cited by examiner

Primary Examiner — Robert C Scheibel
(74) Attorney, Agent, or Firm — Pierce Atwood LLP

(57) ABSTRACT

Methods and systems for providing data to a mobile device from multiple access points are described. The system may include multiple access points (APs) in communication with each other to form a network of APs. The network of APs may include a logical AP (LAP) that is discoverable as an individual physical access point by a mobile device, even though the LAP may be a logical construction involving multiple physical APs that communicate with the mobile device. The system may synchronize operations within the network of APs for effective and efficient data transmissions. The mobile device may request a data connection from the LAP or from an individual AP, wherein the data connection is between at least two APs. The data connection may have a throughput/bandwidth exceeding the maximum capacity of individual APs. The LAP may manage connections between the APs and connections between the mobile device and the APs.

18 Claims, 10 Drawing Sheets

COORDINATED BEAMFORMING

BACKGROUND

Computing devices are capable of sending and receiving wireless transmissions to and from other devices. Many different systems exist to coordinate wireless transmissions among devices.

BRIEF DESCRIPTION OF DRAWINGS

For a more complete understanding of the present disclosure, reference is now made to the following description taken in conjunction with the accompanying drawings.

DETAILED DESCRIPTION

Figure 1:
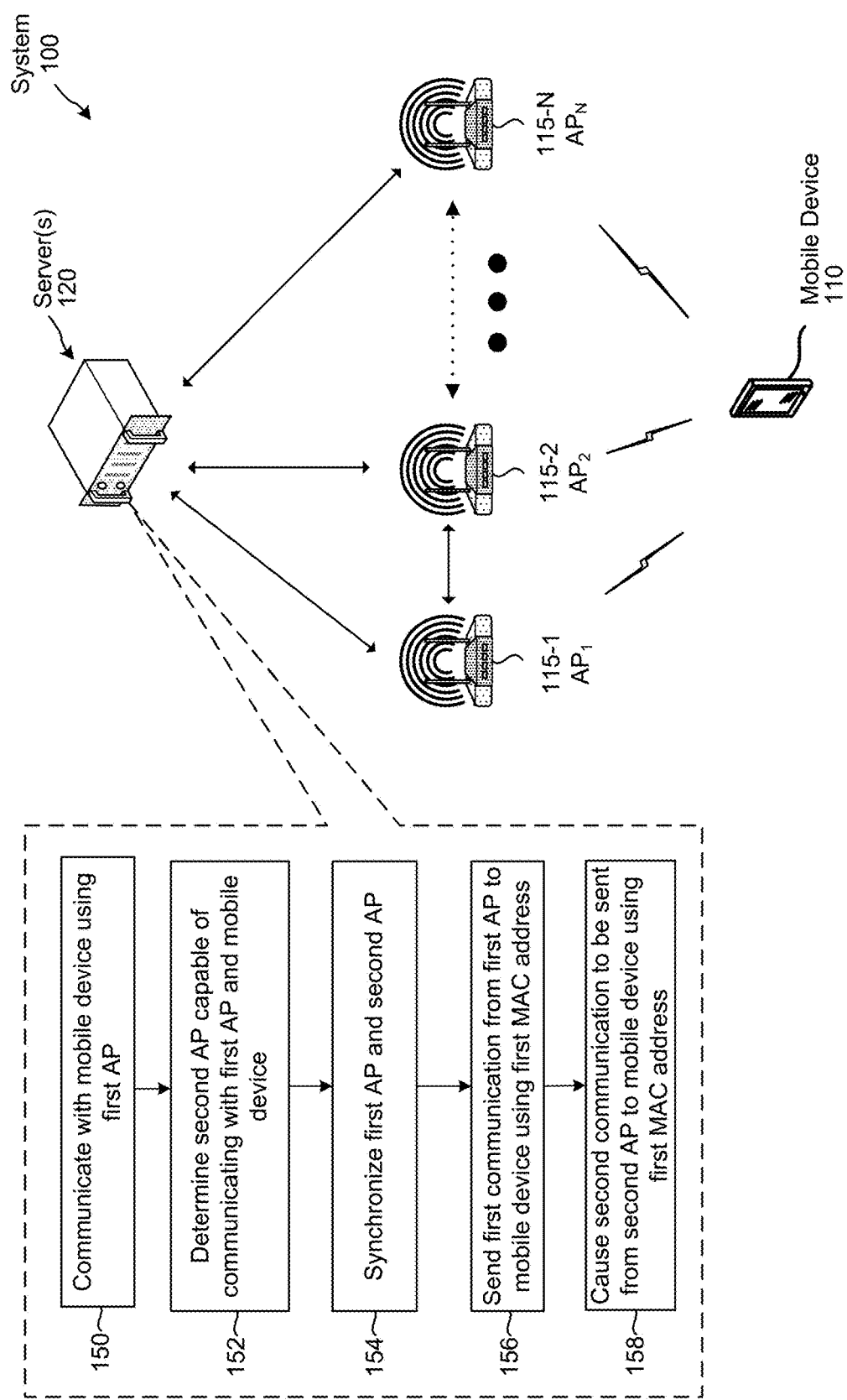
FIG. 1 illustrates a system and method for communicating with a mobile device via a plurality of access points, according to embodiments of the present disclosure.

Electronic devices may receive data wirelessly from a device called an access point (AP). The data sent by wireless APs allow mobile computing devices to establish data connections with the wireless APs and access the internet or other public or private computer networks. Each wireless AP may be equipped with hardware, and programmed with software, to communicate with specific types of mobile devices. Similarly, each mobile device served by the AP may be equipped with hardware and programmed with software to ensure compatibility with certain wireless APs. Such compatibility allows the mobile device to be able to communicate with the wireless APs in order to gain access to a wireless network, such as a local area network (LAN).

Wireless APs (or routers) broadcast data via antennas coupled to a transceiver of the router or wireless AP. A wireless AP may be configured to transmit signals using more than one antenna. The AP may transmit data individually to a single mobile device (e.g., unicast transmission) or to multiple mobile devices simultaneously (e.g., multicast transmission). If the AP sends data to multiple devices using unicast transmission (where each device receives its own data), the bandwidth available to the AP is split between the multiple devices being serviced by the AP and each device receives its data using a portion of the total bandwidth. If the AP sends data to multiple devices using a multicast transmission (where the AP sends the same data to multiple devices at the same time), the AP may use its bandwidth without dividing the bandwidth among different served devices.

In some situations, however, a mobile device may have bandwidth or throughput requirements that are beyond the capacity of a single AP. Beamforming is a technique used to focus wireless signals to a specific device or location. By focusing wireless signals to a specific location, the wireless APs may increase the bandwidth capacity and throughput provided to a particular mobile device or (or other recipient of the wireless signals). Beamforming may also include transmitting data via two or more wireless access points to a receiver or device capable of receiving wireless signals.

Coordinated beamforming (network beamforming) utilizes multiple APs to simultaneously beamform to a particular mobile device or (also called a station (STA)). An example beamforming configuration is shown in the FIG. 1. In order for each wireless AP to provide consistent and reliable connectivity and data transfer to a mobile device, the network of wireless APs must be synchronized so that the appropriate data is sent from the network of wireless APs to the correct mobile device. There are numerous aspects of synchronization that may be applied to devices existing on a network. One example of such synchronization is called node synchronization, where multiple data packets are transmitted from different APs and are coordinated to arrive at the mobile device at substantially the same time. Another example of synchronization is time synchronization, where the network of APs are configured to successfully communicate with each other within the network based on send time, propagation time, and receive time. A few other examples of synchronization frequency synchronization and content synchronization, which all may be executed by the system to improve data transmission between the APs in the network and between APs and mobile devices.

Beamforming, however, can provide significant challenges, particularly where a wireless AP includes multiple antennas which are not sufficiently separated. Beamforming from a single device or wireless router with more than a certain number of antennas (e.g., 4) is not practical at certain transmission frequencies in which WiFi compatible devices operate (such as the 2.4 GHz or 5 GHz bands) due to physical antenna separation limitations required to implement viable beamforming algorithms.

Offered is a system and method to improve beamforming data or transmitting beamformed data from multiple APs to a mobile device. In one embodiment, a server may be in communication with a plurality of APs. In certain embodiments an AP is a separate physical device (such as a home wireless router or other networking hardware) that allows a WiFi (or other wireless communication) compliant mobile device to connect to a wired network through the AP. Each AP may be in communication with the other APs to form a AP network. In this embodiment, a mobile device or wireless device (also known as a user equipment or station (STA)) may be in communication with at least one of the physical APs. The communication between the mobile device and the AP may be a WiFi connection, Bluetooth connection or any other type of wireless connection that may be established between the wireless device and the single AP.

The mobile device, while in communication with the AP, may request data from the network that may require an enhanced connection to be established between the mobile device and the AP. A user of the mobile device may want to download or stream data from the network, wherein the user demands a high-speed or high transfer capacity that is not feasible or possible via a single wireless connection. For example, the mobile device may be connected to a single wireless AP and the user may desire an even faster wireless connection to improve the streaming quality of content from the network. In other words, the user may desire a wireless connection with data transfer rates that exceed the maximum capacity of any wireless AP within proximity of the mobile device range. Therefore, the user may request an enhanced connection to be established between the mobile device and at least two wireless APs (though in order to allow communication with multiple APs, the mobile device must be configured to establish a connection with more than one AP). An enhanced connection is one in which the data transmission specifications (e.g., bandwidth, throughput, frequency, data transfer rate, etc.) exceed the maximum allowed capabilities of a connection between a single wireless AP and a mobile device. For example, according to the IEEE, the maximum data transfer rate for different types of wireless local area network (WLAN) standards are as follows: 802.11b is 11 Mbit/s, 802.11g is 54 Mbit/s, 802.11n is 600 Mbit/s, 802.11ac is 1.3 Gbit/s. Under a particular standard, the maximum rate for data transfer corresponds to the standard.

A data connection may be formed between a plurality of APs and a mobile device using, wherein the data connection may be a beamformed connection utilizing wireless channels emanating from the wireless APs. In particular, if a first AP and a second AP are commissioned under the 802.11b standard, then a beamformed data connection will have a maximum data transfer rate of 22 Mbit/s. The beamformed connection will include the properties and data characteristics of each AP combined. In another example, the first AP may be commissioned under the 802.11n standard and the second AP may be commissioned under the 802.11ac standard, yielding a beamformed connection with a maximum data transfer rate of 1.9 Gbit/s. Any combination of WLAN standards or other wireless signal standards may be used.

However, only certain APs may be in communication with the other AP that is within range of and communicating with the mobile device (sometimes called the serving AP). Further each wireless AP may not be within the coverage area of the other wireless APs. If the wireless APs are not within each other's coverage area or are not connected to a common network, it would be difficult for a mobile device to receive reliable data from more than one wireless AP while satisfying performance thresholds and expectations of the user. Upon receipt of the request for the enhanced connection, the system may determine a number of APs within proximity of the mobile device that requested the enhanced connection. Further, the system may determine which APs within proximity of the mobile device is capable of and/or configured to communicate with the other wireless APs within proximity of the mobile device. The system may establish a network of APs comprising the APs within proximity of the mobile device (called the AP network). Establishing the network may include designating a list of APs that are in communication with each other and configuring management of the APs within the network. The network of APs may be configured to allow an external device access to the network by association and authentication.

A first AP may be in communication with a mobile device and may be transmitting data or a message to the mobile device. A second AP may also be in communication with the first AP and the mobile device, wherein the second AP may receive data or a message instructing the second AP to begin transmitting data or another message to the mobile device. The mobile device may not be aware that it is now receiving data from the second AP, but may determine that it is receiving additional data at a higher data rate than it was previous to the second AP beginning to transmit data to the mobile device. The mobile device may receive data at a higher data rate at least for receiving data from both the first AP and the second AP at the same time. The second AP may receive data correspond to an address of the mobile device in order to communicate and/or send data to the mobile device.

Once it is determined which nearby APs may communicate with each other, the system may perform synchronization operations (e.g., node synchronization, frequency synchronization, timing synchronization, content synchronization, etc.) on the group of wireless APs. The synchronization operations (further described below) configure the network of APs to transfer data throughout the network and allows the system to detect movement, location and proximity of the APs in the network and also of any mobile device in communication with any of the APs in the network. Each synchronization operation may be performed according to a hierarchy depending on the network environment and/or settings of all the connected devices on the AP network. Further description of each synchronization operation will be provided throughout this specification.

The system may also associate the mobile device with an AP or vice versa. Association may occur before or after the APs synchronize within the network. Association may occur when a mobile device registers with an AP to gain full access or limited access to the network(s) reachable through the AP. During association the mobile device may request address information from an AP in the network and also provide device information to the AP. The AP's MAC (media access control) address may be used to perform association and also to confirm that each AP MAC address in the AP network is identical. If any one of the AP's MAC addresses are not identical to the other AP MAC addresses, the system may not be able to perform association and/or authentication with a mobile device requesting access to the network. Data packets destined for a particular receiver may include the same MAC address to ensure each data packet is sent to the correct recipient, but the data packets may arrive at the destination via different paths. For example, when the mobile device receives data over an enhanced connection or over a beamformed connection, different paths from different APs may carry the same data packets, hence the same MAC address. This is discussed in further detail below in reference to FIG. 7.

During authentication, the AP may recognize the mobile device's identification information and confirm that the mobile device is permitted to access the network via the proposed anchor AP. The authentication operation verifies that the mobile device has permission to access the network via the proposed anchor AP or any other AP in the network. Any mobile device that does not satisfy authentication requirements may not be granted access to the network or access beyond the secured network of the AP accessed to provide authentication information. For example, an AP may implement a captive portal designed to ensure that only authorized users access a network.

The system and methods described herein may execute multiple configuration operations to build or commission the AP network and to establish the relationships between the APs in the network. The configuration options may include an option where all the APs have unique MAC addresses. For example, a first AP has a first MAC address, a second AP has a second MAC address, a third AP has a third MAC address, and the LAP has a fourth MAC address, wherein the first MAC address, the second MAC address and the third MAC address are each different from the other. The LAP may also include a MAC address that is unique from the MAC address of the first AP, the second AP and the third AP. Another option may include an option where all the APs have unique MAC addresses, but a logical AP (LAP) including its own unique MAC address is formed among the physical APs. For example, a first AP has a first MAC address, a second AP has a second MAC address, a third AP has a third MAC address, and the LAP has a fourth MAC address, wherein each MAC address is different from the MAC address of the first AP, second AP and the third AP. The LAP may not be a separate device, but rather a software construct operated by one of the physical APs or a separate device, such as a server in communication with one or more APs in the AP network. As used below, the term LAP refers to a logical AP that may be run by one of such devices, whereas the term PAP (for physical access point) refers to a physical device with an antenna capable of wireless communications with a mobile device. The LAP may have or be assigned a MAC address that is used to identify the LAP in executing communications with other devices. The LAP MAC address may be used by the APs in the AP network to communicate with the mobile device as part of a multi-AP connection. For example, a mobile device requesting access to the LAP may receive the LAP MAC address, but may be able to receive information from any of the PAPs that can operate as the LAP, even though the mobile device did not receive the MAC address from the individual PAPs associated with the LAP. Another configuration option may be a configuration where all PAPs and the LAP use the same MAC address, for example for purposes of communicating using the enhanced connection. For example, a first AP has a first MAC address, a second AP has a second MAC address, a third AP has a third MAC address, and the LAP has a fourth MAC address, wherein the LAP MAC address is identical or the same as the MAC address of the first AP, second AP and the third AP.

An individual router or access point may be assigned only one unique MAC address to be identified by other network device to establish a network connection. However, in an example embodiment, an individual AP or network router may be assigned more than one MAC address or may be configured to be identified by a plurality of MAC addresses. An AP that may be identified by more than one address may establish a network connection with multiple network components including multiple APs or multiple mobile devices. For example, a first AP may include a first MAC address to establish a communication connection with a second AP using a first MAC address, wherein the second AP includes its own unique MAC address. The first AP, while in communication with the second AP may establish a communication connection with a mobile device using a second MAC address, wherein the second MAC address may be assigned to the first AP. Alternatively, the first AP may be in communication with the second AP using the first MAC address and may establish a communication connection with a third AP, wherein the first AP includes a third MAC address to communicate with the third AP. The methods and systems described herein are not limited to the specific disclosures, but may include other combinations of MAC address assignments to APs and mobile devices within the network.

FIG. 1 illustrates a high-level conceptual diagram of a system 100 for providing a multi-access point connection to a mobile device 110. As illustrated in FIG. 1, the system 100 may include server(s) 120 communicatively coupled to a plurality of access points (APs) $AP_1$ 115-1, $AP_2$ 115-2, . . . $AP_N$ 115-N, wherein the plurality of APs 115 may be in communication with a mobile device 110. The mobile device 110 may connect to at least one AP 115 to transmit or receive data. The data received by the APs 115 may include digital content (e.g., audio, images, video or the like), digital files (e.g., firmware data, multimedia documents, such as text files or the like, etc.) or other data, and may be streamed to the mobile devices 110 (e.g., portions of the data received and displayed over time) and/or downloaded to the mobile device 110 (e.g., entirety of the data received and stored on the device 110 prior to displaying the data).

The system 100 may send the data to the mobile device 110 using at least one of the APs 115. The source of the data may be connected to the APs via a wired or wireless connection. The source of the data may also be the server 120 or database (not shown) in communication with the server 120. Systems or methods for providing data to a mobile device 110 from multiple APs 115 may include communicating (150) with the mobile device 110 using a first AP 115 located in a first coverage area. The system or method may also include determine (152) a second AP 115 capable of communicating with the mobile device 110 and also capable of communicating with the first AP 115, wherein the second AP may be located in a second coverage area. The system or method may include synchronizing (154) the first AP and second AP, such as in a manner described herein. The system or method may include sending (156) a first communication from the first AP 115 to the mobile device 110, the first communication may include first data and including a first source address indicating a source of the first data. Further, the system or method may include causing a second communication to be sent (158) from the second AP 115 to the mobile device 110, the second communication including the first data and the first source address. To cause the second communication to be sent the first AP, server 120, or other component may send an instruction to the second AP to send the second communication to the mobile device 110. Alternatively, as part of the AP network the second AP may know when to send the second communication, thus causing the second communication to be sent at the appropriate time. The system or method 100 may further include a network controller embedded in or in communication with either of the network components (e.g., server 120, APs 115). Further, it may be determined that the APs that are within the range of the mobile device have overlapping coverage areas. For example, the first coverage area may overlap with the second coverage area.

An AP 115-1 may be configured to receive data corresponding to authentication information from the mobile device 110. Authentication information may include instructions to execute open system authentication or shared key authentication in order to grant the mobile device 110 access to the network. Receiving authentication information from the mobile device 110 may allow the AP 115-1 (or server 120) to identify the mobile device 110 and determine the location, type of device, status or other pertinent information about the mobile device 110 to provide access to the network. The plurality of APs 115 may also be configured to receive data from the mobile device 110, wherein the data may include a request to communicate or a request to establish a communication link. The data from the mobile device may further include address information (e.g., media access control (MAC) address), configuration information, and other information corresponding to the identity and capabilities of the mobile device 110.

The plurality of APs 115 may also be configured to receive data corresponding to association information from the mobile device 110. The first AP 115 may receive association information from the mobile device 110 to allow the mobile device 110 to associate (or register) with the AP 115 to gain full or limited access to the network. Association allows the AP 115 to record or save data corresponding to each mobile device 110, wherein the data may be used to ensure that data frames are properly delivered during a communication transaction. In some examples a mobile device may only be able to associate with a single AP at a time. However, methods and systems described herein may bypass that limitation and allow a mobile device to associate with an entire network of APs.

When an AP becomes associated with a mobile device, the AP must recognize the MAC address of the mobile device and the mobile device must provide its MAC address to the AP. This process may be described as the handshaking process. When a computer communicates with a foreign device like a network server or mobile device, it needs to handshake with it to establish a connection. This handshaking process usually takes place in order to establish rules for communication when a computer sets about communicating with a foreign device. In the case of coordinated beamforming, the MAC addresses of the APs must be identical when establishing a connection to transmit data to the mobile device. For example, during association, if the mobile device requests to be associated with the AP, the MAC address of the mobile device must be identical to a MAC address saved in a memory of the AP as an authorized MAC address corresponding to the mobile device.

Figure 2:
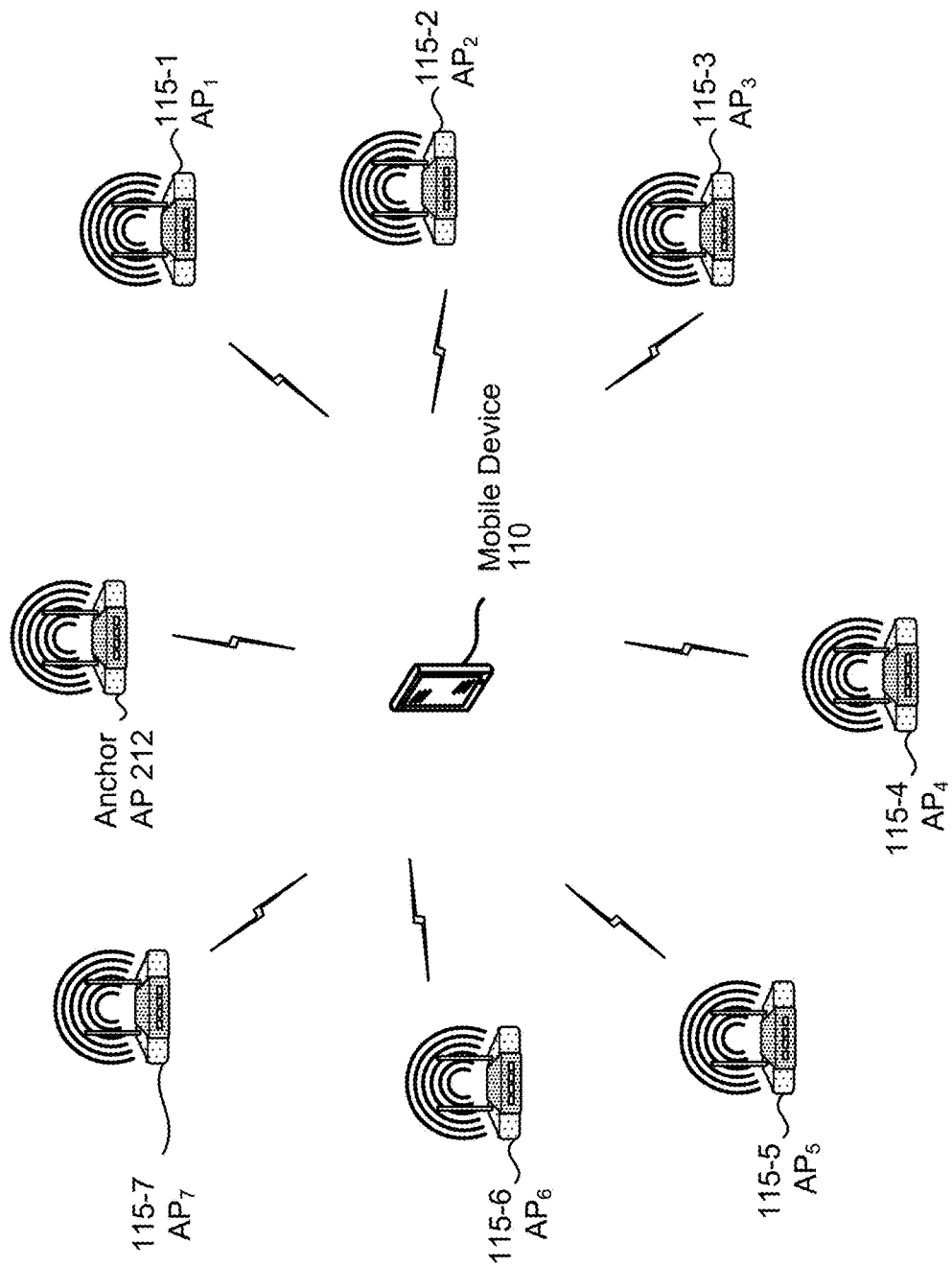
FIG. 2 illustrates a system for communication with a mobile device via a plurality of access points, according to embodiments of the present disclosure.

FIG. 2 illustrates another example embodiment of a system 100 for communicating with a mobile device 202 via a plurality of access points (APs) 115-1 through 115-6. In this example embodiment, the source of the data may be in direct communication with each of the plurality of APs 115-1 through 115-6 through a network (not illustrated). The plurality of APs 115-1 through 115-6 may also be in communication with an anchor AP 212 configured with additional capabilities (i.e., cellular modem, larger capacity battery, etc.). Alternatively, the system may designate at least one of the plurality of APs 115-1 through 115-6 as the anchor AP, wherein the anchor AP 212 may be include additional hardware and/or software to achieve capabilities beyond that of an AP without such additional features.

Referring again to FIG. 2, illustrated is an example wireless communication environment in which various aspects described herein can function. The wireless communication environment can include a mobile device 110, which can be capable of communicating with multiple communication systems. These systems can include, for example, one or more WLAN APs 115-1 through 115-6 or other systems not shown in FIG. 2, or any combination thereof.

WLAN systems 115-1 through 115-6 can respectively implement radio technologies such as IEEE 802.11 (WiFi), HiperLAN, etc. The WLAN system 200 can include one or more access points 115-1 through 115-6 that can support bi-directional communication. Similarly, the WLAN system 200 can include one or more access points 115-1 through 115-6 that can support bi-directional communication. The WPAN system 212 can implement a radio technology such as Bluetooth (BT), IEEE 802.15, etc. Further, the WPAN system 212 can support bi-directional communication for various devices such as wireless device 202, a headset, a computer, a mouse, or the like.

In an aspect, the mobile device 110 can be stationary or mobile and can also be referred to as a user equipment (UE), a mobile station, a mobile equipment, a terminal, an access terminal, a subscriber unit, a station, etc. The mobile device 110 can be cellular phone, a personal digital assistance (PDA), a wireless modem, a handheld device, a laptop computer, a cordless phone, a wireless local loop (WLL) station, etc. In addition, a mobile device 110 can engage in two-way communication with a cellular system (not shown), the WLAN system 115-1 through 115-6, and/or any other suitable systems(s) and/or devices(s). The wireless device 202 can additionally or alternatively receive signals from a broadcast system and/or satellite positioning system (not shown). In general, it can be appreciated that the mobile device 1102 can communicate with any number of systems at any given moment. Also, the mobile device 110 may experience coexistence issues among various ones of its constituent radio devices that operate at the same time. Such coexistence issues are beyond the scope of this application.

Figure 3:
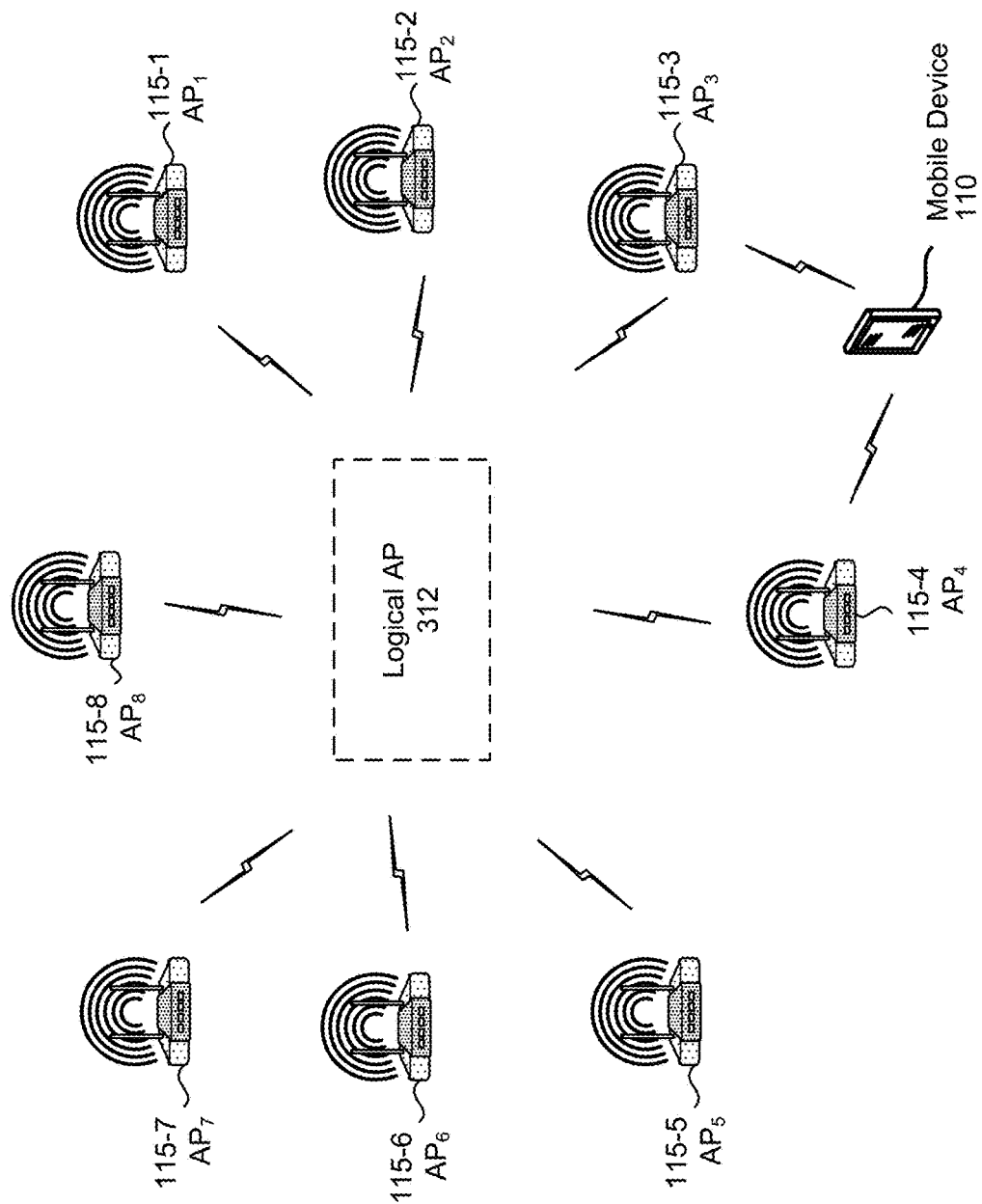
FIG. 3 illustrates a system for a network to provide a communication link to a mobile device via a plurality of access points, according to embodiments of the present disclosure.

Referring to FIG. 3, the system for transmitting data to a mobile device via a plurality of APs 115 may include a network controller configured to adjust network settings of the wireless AP network. The network controller may also be referred to as a logical access point (LAP) 312. The LAP 312 may be implemented across multiple physical APs 115, wherein all the APs 115 involved in the LAP 312 may have the same service-set identifier (SSID) associated with the LAP 312. As known to those of skill in the art, the SSID may be used as an identifier for a wireless LAN, and is intended to be unique for a particular area. The SSID may be chosen by the mobile device 110 or AP 115 in the wireless AP network. Broadcasting of the SSID may be performed in a pseudo-random order by all devices that are members of the network.

The LAP 312 may also be configured to coordinate the APs 115 in the wireless AP network to beamform to any mobile device associated with the wireless AP network. The LAP 312 may implement the downlink coordinated beamforming between the mobile device and a subset or all of the APs under the LAP 312. The LAP 312 may also implement macro diversity on the uplink between the mobile device and a subset or all of the APs to improve uplink performance. The LAP 312 may be configured to determine which of the APs 115 may join or leave the wireless AP network. For every unique mobile device, the mobile device may see or detect a unique LAP 312 based on properties and characteristics of the network of APs. For example, a set of APs 115 may be made available to the mobile device 110 as the logical AP 312. For example, the LAP 312 may serve or provide access to the network of APs via a wireless connection with the mobile device 110, without the mobile device 110 being aware of or knowing that it is being served by multiple APs.

The LAP may determine which mobile device can be beamformed to, based on the resources (i.e., maximum spatial streams, etc.) available, the QoS (Quality of Service) setting, the type of data traffic (i.e., streaming versus best efforts, etc.) and the channel condition. Other factors may contribute to determining whether or not a mobile device can establish a beamformed connection with an AP, including auxiliary information corresponding to the AP.

The LAP may also be configured to provide mobility and roaming support to the mobile device will associated with the wireless AP network. For example, the LAP may allow the mobile device to roam seamlessly throughout the coverage area of the wireless AP network without experiencing down-time or other performance degradation in receiving and processing data received from the LAP.

Figure 4:
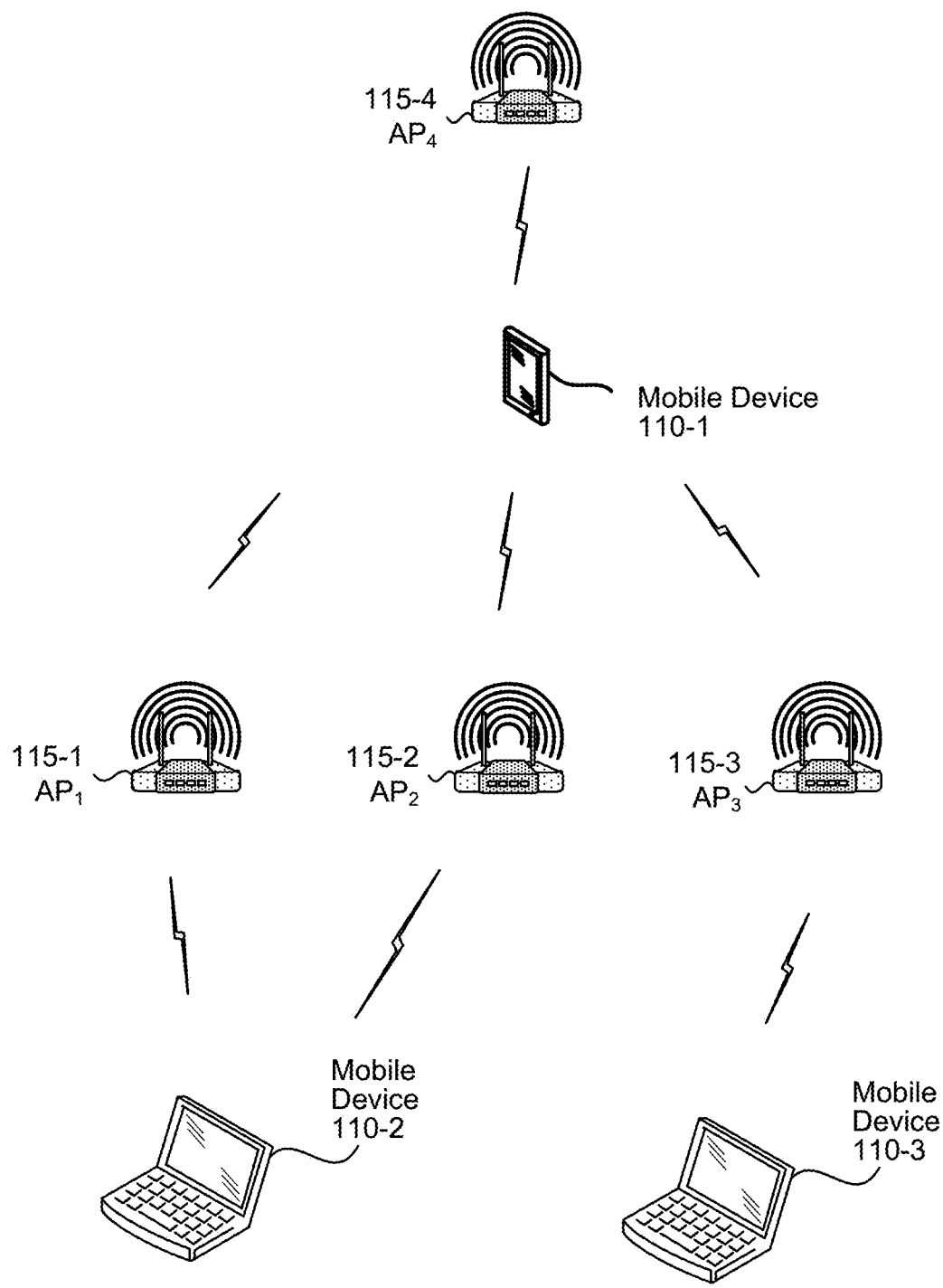
FIG. 4 illustrates a system for communicating to a mobile device via a plurality of access points, according to embodiments of the present disclosure.

Referring to FIG. 4, a system for communicating to a mobile device via a plurality of access points may include a mobile device 110-1 in communication with a plurality of APs 115-1 through 115-4. APs 115-1 through 115-3 may be in communication with other mobile devices, such as devices 110-2 and 110-3, to form a network of access points.

Figure 5:
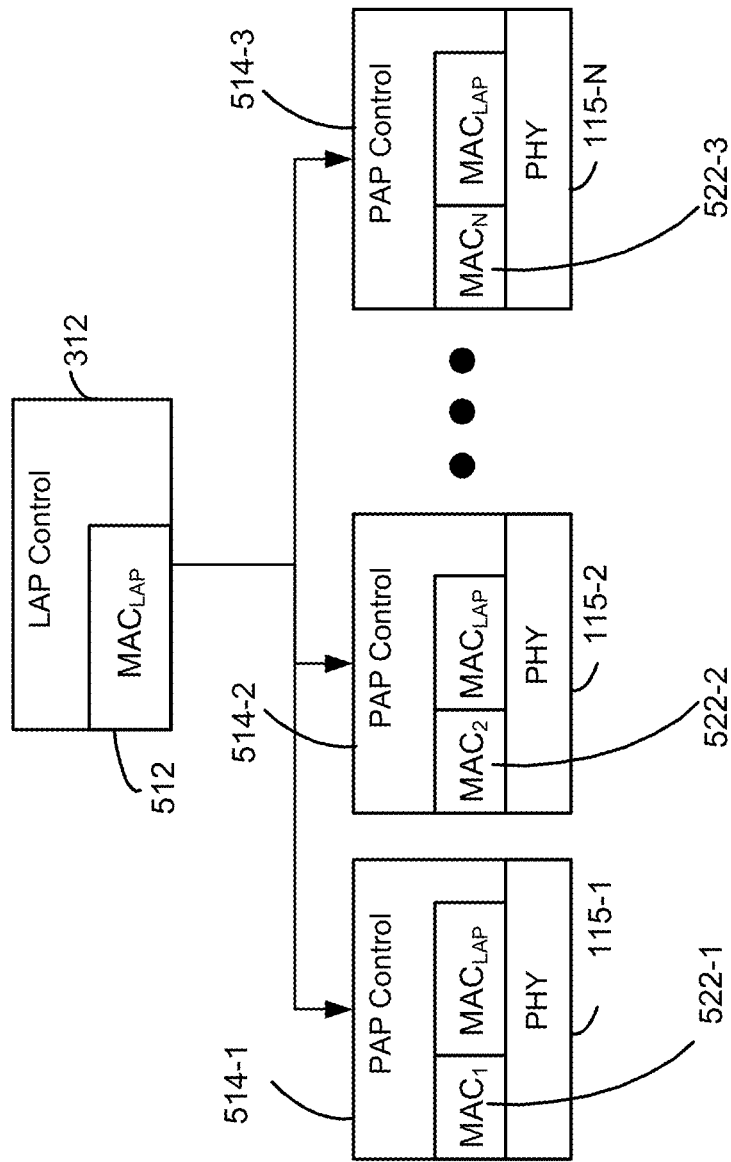
FIG. 5 is a diagram conceptually illustrating components for an example system for sending data according to embodiments of the present disclosure.

Referring to FIG. 5, the system describing the relationship between the logical access point (LAP) 312 and the physical APs (PAPs) 115 is illustrated. Conceptually, the LAP 312 is a separate entity in the system. The LAP 312 can be a centralized controller or a distributed layer across all PAPs 115 (or just distributed across the anchor PAPs and the client PAPs shall be controlled by the anchor PAPs). The LAP 312 may execute instructions to create and/or delete an AP network, which may include a downlink beamformed sub-group (BFSG) and an uplink the macro-diversity sub-group (MDSG). The BFSG may include a sub-group of PAPs that can communicate through downlink communications (i.e., AP to mobile device) to a specific mobile device. That is, the BFSG may include the APs that can talk to a specific mobile device. The MDSG may include a sub-group of PAPs that can communicate through uplink communications (i.e., mobile device to AP) from a specific mobile device. That is, the MDSG may include the APs that can receive communications from a specific mobile device. Together, the devices from the BFSG and the MDSG may comprise the AP network. While the PAPs that make up the BFSG may be the same as the PAPs that make up the MDSG may be the same, due to communication conditions, in certain situations different PAPs may be in the BFSG than those in the MDSG. For example, referring again to FIG. 2, $AP_1$ 115-1 through $AP_5$ 115-5 and anchor AP 212 may be capable of sending downlink messages to the mobile device 110 and thus may be included in the BFSG, whereas $AP_3$ 115-3 through $AP_7$ 115-7 and anchor AP 212 may be capable of receiving uplink messages from the mobile device 110 and thus may be included in the MDSG. Together all devices AP 212 and $AP_1$ 115-1 through $AP_7$ 115-7 may form the AP network.

The BFSG may be formed by selecting a number of APs that are capable of communication with the mobile device. Once it is determined which APs are capable of communication with the mobile device, available resources of each AP may be determined in order to determine which of the APs should be used to form the BFSG (e.g., which APs will result in a better performing BFSG). For example, each AP may determine an available amount of power, signal strength, available buffer, bandwidth, throughput, frequency, etc. A determination based on the available AP resources and/or characteristics may be performed to determine which of the APs may be used to form the BFSG. The MDSG may also be formed using similar operations as described for the BFSG. However, the MDSG may place higher priority on different variables in the calculation as compared to the calculations performed for the BFSG, at least because the MDSG may be formed for the uplink and the BFSG may be formed for the downlink. The uplink may require different combinations and quantities of resources than the downlink to serve its purpose in the system. Furthermore, the number of APs selected to form the BFSG for the downlink may be different than the number of APs selected to form the MDSG for the uplink. Also, as noted above, the group APs selected for the BFSG may not be the same group selected for the MDSG.

The MDSG may be formed for the uplink based on a number of APs that may be able to detect the signals from the mobile device. The APs may detect and decode signals from the mobile device and transmit the corresponding data to the LAP control or to the PAP control, depending on the configuration option. The PAP control or LAP control may receive the data from the MDSG and determine which of the APs in the MDSG correctly decoded the transmission from the mobile device and notify the other APs that one of the APs successfully decoded the transmission from the mobile device. Therefore, the PAP control or the LAP control's ability to decode the transmission and communicate to the other APs in the MDSG will increase the probability that the transmission from the mobile device is received accurately without significant additional steps.

An AP may be selected to be a member of the BFSG or the MDSG by numerous different methods. The downlink PAP that is able to receive uplink data may transmit the received data to the PAP control or the LAP control. By successfully transmitting this data to the control, this AP may be eligible to being included in the MDSG. However, selection of APs for the BFSG for the downlink may be different than the selection process for the MDSG for the uplink. Both the BFSG and the MDSG may be determined by the controller (either PAP control or LAP control) to which the APs are in communication with or connected to.

For example, the BFSG may be formed based on estimating the capacity or ability of available channels along with other auxiliary information. Auxiliary information may include AP buffer status, power headroom, or other information relating to the AP. Power headroom may be described as available power remaining at the AP before AP power consumption reaches a maximum allowed either physically by the device or allowed under FCC regulations. The auxiliary information may be sent to the controller from the APs at least to be used in determining the BFSG. The controller may then be configured to determine which AP should be added to the BFSG based on the AP power level and/or the phase/amplitude factors at the antennae of the AP. APs in the BFSG may then be informed or receive data from the controller instructing the AP to perform some act or actions at a predefined time.

The MDSG may be formed by numerous methods. For example, a BFSG may be formed by each AP, that can detect or communicate with a mobile device, may be configured to report or transmit data to the controller, wherein the data may include received signal strength indicator (RSSI) for the mobile device. The RSSI corresponds to the signal strength in a wireless network environment. The RSSI may also be a measure of the power level that a RF client device or mobile device is receiving from an AP. The controller may be configured to determine which AP should be added to the MDSG and communicate such determination to each AP accordingly.

The LAP 312 may also determine when a particular beamformed (BF) weight should be applied based on the confidence level of the channel estimation results reported by the PAP control 514. The LAP 312 may also determine the BF weights for all the BFSGs and to provide data trigger the PAP controls to change the PAP antenna weightings accordingly. The LAP 312 may also select the anchor APs and notify the PAP controls of data transfer throughout the wireless AP network. Further, the LAP 312 may be configured to maintain the timing and frequency synchronization integrity for all the PAPs within the LAP 312. The LAP control 312 may determine that the nodes (APs, PAPs, etc.) are not synchronized and perform a shut-down sequence to shut down all the BFSGs and redirect all mobile devices to nearby PAPs for continuing services. The LAP 312 may also be configured to perform resource management among the wireless AP network, wherein resource management may include monitoring resource consumption, determine which PAPs may be used to form the BFSG and other operations. The LAP 312 may also be configured to ensure the data contents are synchronized within all the BFSGs.

As shown in FIG. 5, each PAP 115 may be configured to communicate with its own MAC address 522, for communications involving that particular PAP. For example, $PAP_1$ 115-1 may be configured to communicate with MAC address $MAC_1$, $PAP_2$ 115-2 may be configured to communicate with MAC address $MAC_2$, and so on. However, for purposes of communicating as part of the AP network where communications from multiple APs are coordinated to as single AP, the PAPs may also receive a different MAC address corresponding to the LAP. Thus, as shown in FIG. 5, the LAP MAC address $MAC_{LAP}$ 512 may exist in the PAPs 115 and/or the LAP 312. The LAP $MAC_{LAP}$ 512 may be used to perform content synchronization within the BFSGs. The LAP $MAC_{LAP}$ 512 may also be configured to perform macro-diversity combining within the MDSGs.

The PAP control 514 may be configured to execute multiple operations within the LAP 312. In particular, the PAP control 514 may be configured to measure and/or record the BF weights from the LAP control 312 for the BFSGs and apply the BF weights to relevant PAP physical layers (PHYs). The PAP control 514 may also be configured to perform timing and frequency synchronization and/or performing mobility and roaming operations. For example, the mobile device is in communication with a first AP and a second AP, and as the mobile device moves away from the second AP, the LAP may configure a third AP to be in communication with the mobile device. However, the mobile device may not be aware of the switch between the second AP and the third AP because the LAP may manage the connections so that an interruption in service is not noticed by the mobile device. The LAP may execute this hand-off or swap between the APs by assigning MAC addresses or MAC IDs to the appropriate APs to accommodate for the mobile device moving into and out of the coverage area of the APs.

Furthermore, the PAP control 514 may be configured to coordinate the PAP MAC 522 and LAP MAC 512 traffic. In particular, the PAP control 514 may facilitate the communication between a non-BF mobile device with the PAP 115. The PAP control 514 may also facilitate the communications between a BF mobile device and multiple PAPs 115 as handled by the LAP MAC. BFSG traffic may take precedence over non-BF traffic as BSFG traffic affects multiple PAPs. The PAP control 514 may also be configured to trigger the BFSG transmission request to PAP MAC at a prescribed or pre-determined time as ordered by the LAP control 312. The PAP control 514 may also be configured to provide a report of the channel estimation as results for all the BFSGs to the LAP control 312. Any content synchronization requests submitted by either the PAPs or the LAP may be executed by the PAP control 115 or the LAP control 312. The PAP control 514 may inform PAP MACs of any content synchronization requests from LAP control 312. Transmitting PAP MAC BFSG content buffer status to LAP control 312 (including, e.g., buffer size, service data unit (SDU) counter of the first and last packet). The PAP control 514 may also identify whether a non-BT mobile device should be considered for beamforming by the LAP 312. For example, the PAP control 514 may send data corresponding to a profile of the mobile device requesting the BF connection to the LAP 312. The LAP 312 may then receive the data corresponding to the request and determine whether a BF connection should be provided to the mobile device.

Referring to FIG. 5, the LAP control 312 may be configured to assign new or additional MAC resources (MAC address, MAC control, etc.) to each PAP or AP 115. For example, an AP 115 may include two MAC modules or MAC components, each one dedicated to serve its own purpose in the AP 115. $MAC_1$ may be included to serve the original purpose of the AP 115, such as establishing a wireless connection with a mobile device or another AP 115 in the network. $MAC_{LAP}$ may be included to serve an additional purpose of the AP 115, such as associating with of synchronizing with the other APs in the network of APs. In other words, the $MAC_{LAP}$ may be included to form the LAP and to enable AP 115 to be communication with the LAP control 312 and/or $MAC_{512}$.

The PAP MAC may be configured to cache the BFSG contents and report the BFSG content buffer status to the LAP 312. The PAP MAC may also adjust the BFSG content buffer according to the PAP control's 514 request. The PAP MAC may also provide or initiate the initial BFSG transmission according to the PCP control's request. Even further, the PAP MAC may be configured to forward the cyclic redundancy check (CRC) results together with the received package or data packet (if CRC check returns 0) to LAP MAC for MDSG processing.

The systems and methods described herein may determine that the APs in the AP network are node synchronized. Node synchronization occurs in an AP network when multiple copies of the same data is transmitted from different APs and arrive at the mobile device as though the data came from the same transmitter or AP. In this example, not all the data is sent over one channel to the mobile device. Instead, the mobile device establishes unique channels of communication with each AP (as part of the AP network) and the segregated data comes in on each channel but at the same time, thereby increasing the throughput between the network of APs and the mobile device. The cyclic prefix (CP) or guard interval in a 4 μsec Wi-Fi orthogonal frequency-division multiplex (OFDM) may be 0.8 μsec long. In the scenario where the mobile devices in the deployment of the AP network are all "pedestrian" type devices (moving at a maximum speed of 3 km/hr), the radio environment under these circumstances can be modeled by the International Telecommunication Union (ITU) model. Table 1 below lists various different pedestrian channel models that may be used in 3GPP and or 802.11.

TABLE 1

| ITU PA | Delay [ns] | 0 | 30 | 70 | 90 | 110 | 190 | 410 | | |
|---|---|---|---|---|---|---|---|---|---|---|
| Outdoor | Power [dB] | 0 | −1 | −2 | −3 | −8 | −17.2 | −20.8 | | |
| ITU TU | Delay [ns] | 0 | 50 | 120 | 200 | 230 | 500 | 1600 | 2300 | 5000 |
| Outdoor | Power [dB] | −1 | −1 | −1 | 0 | 0 | 0 | −3 | −5 | −7 |
| ITU PA | Delay [ns] | 0 | 50 | 110 | 170 | 290 | 310 | | | |

TABLE 1-continued

| | | | | | | | |
|---|---|---|---|---|---|---|---|
| Indoor | Power [dB] | 0 | −3 | −10 | −18 | −26 | −32 |
| ITU PB | Delay [ns] | 0 | 100 | 200 | 300 | 500 | 700 |
| Indoor | Power [dB] | 0 | −3.6 | −7.2 | −10.8 | −18 | −25.2 |

As shown in Table 1 above for example, outdoor typical urban (TU) scenarios, Wi-Fi will suffer from multiple interference. If the path strength (3 dB below the maximum) is ignored, it may be feasible to support the TU channel.

During node synchronization, packets (data packets or network packets) are transmitted from one node to another via a communication medium. A network packet is a formatted unit of data carried by a packet-switched network. When data is formatted into packets, packet switching may be achieved and the bandwidth of the communication medium can be better shared among users than with other methods. A packet may include control information and user data, which may also be called the payload. Control information provides data for delivering the payload, for example, source and destination network addresses, error detection codes, and sequencing information. Typically, control information is found in packet headers and trailers.

The packets may include data including content, address information (source and destination information) and other information pertinent to the source node. The packets may be transmitted in a particular sequence based on how the receiver of the packet is configured to receive and process the data in the packet. Also, packets from the same source may be sent to multiple destinations. Packets may also be sent to the same destination, but as multiple copies of the same packet so that the destination receives the same packet twice, three or more times.

For example, a first message may be sent to a mobile device from a first AP and a second message may be sent to the mobile device from a second AP. The first message and the second message may include the same payload data or may include different payload data. As noted above, sending the duplicate data to the same mobile device from a first AP and a second AP may provide more reliable data at a higher data transfer rate than otherwise. If the same payload data is sent to the mobile device in the first message from the first AP and in the second message from the second AP, the system may coordinate the first message and second message to arrive at the mobile device at substantially the same time. To coordinate message arrival the system may estimate a first travel time of a message from the first AP to the mobile device and may estimate a second travel time of a message from the second AP to the mobile device. The system may then determine a difference in travel time from the first travel time to the second travel time. The system may then cause the first message to be sent at a first time and may cause the second message to be sent at the second time, where the second travel time is offset from the first travel time by the difference. Thus, the first message and second message should arrive at the mobile device at substantially the same time.

In another example embodiment, transmitting packets to the mobile device from multiple APs may be done in a particular sequence so that the packets arrive at coordinated times. For example, a first packet with first payload data may be sent from a first AP to the mobile device at a first time and a second packet with second payload data may be sent from a second AP at a second time, wherein the second time is at an amount of time after or before the first time. Packet transmission times may be coordinated so that the mobile device receives the correct packet at the correct time to maintain data transmission accuracy. For example, the first payload data and second payload data may correspond to a same data item, such as a content item like a song, movie, or other multimedia item. The packet transmission times may be coordinated so the first message with the first payload data sent by the first AP arrives at the mobile device at a specified time before the second message with the second payload data sent by the second AP arrives at the mobile device. The specified time may be related to the time it takes the mobile device to perform certain processing of the first message and/or first payload. Data transmission accuracy may ensure that the mobile device receives the data in order to process and maybe display content included in the data to a user without significant errors, delays and/or jitters.

Each AP may include cache components to store data so that future requests for data can be served faster. The data stored in a cache may be the result of an earlier computation, or the duplicate of data stored elsewhere. The APs of the systems and methods described herein may include a cache to store data during the synchronization operations.

Table 2 below summarizes the maximum timing offset that may be allowed for various different "cut off" levels based on the strength of the paths.

TABLE 2

| Maximum offset between the first paths from different APs [nsec] | | Channel Model | | | |
|---|---|---|---|---|---|
| | | PA Outdoor | TU Outdoor | PA Indoor | PB Indoor |
| Relative Power Cut Off - exclusive [dB] | −3 | 710 | 300 | 800 | 800 |
| | −10 | 690 | Not supported | 690 | 600 |
| | −20 | 610 | Not supported | 630 | 300 |

Figure 6:
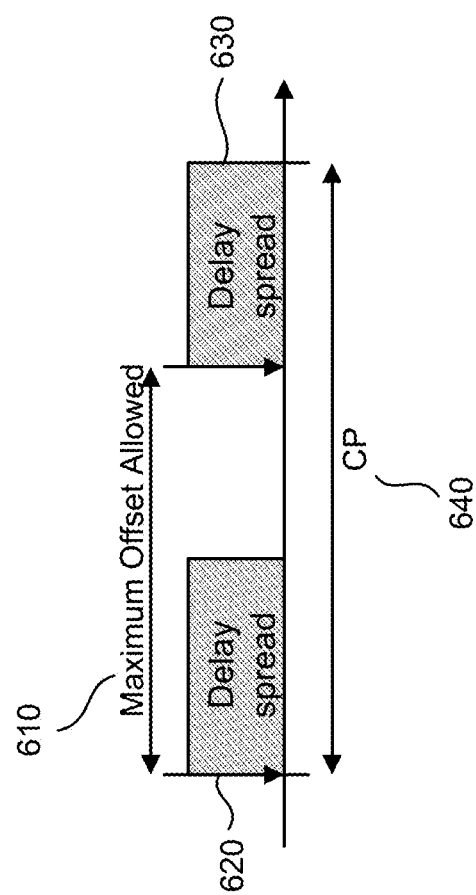
FIG. 6 illustrates an example of a system for executing a data transfer maximum delay, according to embodiments of the present disclosure.

Referring now to FIG. 6, and summarized in Table 2 above, the maximum offset between the first paths from different APs is illustrated. Thus, communications from multiple APs to a single mobile device may account for this maximum offset. The maximum offset allowed 610 may include an amount of time beginning from a first delay spread 620 to the beginning of a second delay spread 630. The cyclic prefix 640 may include the maximum offset allowed 610 plus a second delay spread 630. For example, a timing synchronization may be between 710 nsec and 300 nsec. Further, a reasonable timing synchronization may be 500 nsec. Not all nodes have to be synchronized to a particular absolute frequency or timing. However, all nodes or APs must be able to begin transmitting data according to the maximum offset window described herein to be able to achieve coordinated beamforming with reasonable success.

The systems and methods herein may determine that the APs in the AP network are frequency synchronized. The frequencies of the APs may be synchronized in a variety of different methods. Frequency synchronization is the process of correcting carrier frequency offset in wireless communication systems. Frequency synchronization may also include manipulating the frequencies of carrier signals for a particular purpose. For example, the frequencies may be synchronized over-the-air (OTA) using radio signals, GPS signals or other wireless signals. In the OTA example, an available radio signal may be used as a source for frequency synchronization. The available sources could be from a nearby cellular tower, or a designated "anchor" AP within the group of APs to provide a periodic beacon as a source for frequency synchronization. By locking on to the cellular signal, APs can achieve very good frequency accuracy (and timing accuracy as well if the AP is capable of decoding the cellular signal with a built-in cellular modem.

A network controller (or a logical AP) may designate the anchor AP to broadcast beacon at higher power for the "client" (i.e., non-anchor) APs to lock on to. If the number of APs is large such that one anchor AP is not sufficient to cover all the client APs, the system may designate a hierarchy of APs. In the hierarchal approach, the system may designate a primary AP to include additional equipment to have a range greater than that of a basic AP. The primary AP may be included in a set of more complex and costly anchor APs that may have a built-in cellular modem to build a first layer of synchronization. The anchor AP may be more costly because it may include a cellular modem, additional memory and/or a processor or other computing equipment that is not necessary to function as a basic AP. The more cost effective client APs covered by these anchor APs are synchronized to these anchor APs through the beacons. The benefit of the OTA approach to AP synchronization is that good frequency synchronization can be achieved before attempting timing synchronization. However, frequency synchronization is not strictly required (but if the carrier frequencies of any two nodes are drifted too far apart, it may actually do more harm to try to combine them at or beamform them to the receiver).

The systems and methods described herein may determine that the APs in the AP network are time synchronized. The timing offset between any two APs and the roundtrip time between them are calculated as $$\text{Timing offset} = \frac{(T_4 - T_3') + (T_2' - T_1)}{2}$$

and $$\text{Timing offset} = (T_4 - T_1) - (T_3' - T_2')$$

where $T_1$ is the time a first signal is sent from a first AP to a second AP, $T_2'$ is the time the first signal is received by the second AP, $T_3'$ is the time a second signal is sent from the second AP to the first AP, and $T_4$ is the time the second signal is received by the first AP.

This timing synchronization describes how the first AP may be aware of the timing offset relative to the second AP and is capable of requestion information from the second AP to start transmission at a given time that can result in synchonization to the mobile device they are trying to beamform to. If the first AP at Node 1 is not frequency synchronized with the second AP at Node 2, and the first AP becomes aware of the timing offset, the timing synchronization may become obsolete fairly quickly. In other words, once the APs are not synchronized within the timing offset guidelines, the status of each AP becomes more uncertain, adding complexity to the equation, which forces the first AP to be more conservative. A more conservative AP results in more frequent exchange of time stamps between the APs, thus reducing network efficiencies.

The systems and methods described herein may determine that the APs in the AP network are content synchronized. Downlink content may be buffered by all APs in the BFSG ahead of time to perform beamforming efficiently. The system may be configured to embed a higher layer service data unit (SDU) counter into a LAP control message. The SDU counter may be used by the AP control during the communication between the mobile device and the AP to request BFSG transmission to the AP MAC. The SDU counter may be used to synchronize the counter of the first packet of a given transmission. By using the SDU counter, the AP may synchronize the transmission of content from the AP to the mobile device, so that the content arrives without significant losses in quality or content.

The system may be configured where all the APs have unique MAC (or other) addresses. In this example, each AP in the network of APs may be assigned a unique MAC address. In this configuration option, the mobile device may not be able to establish a communication connection with more than one AP because the mobile device may only recognize one MAC address at a time. Further, a LAP may be established within the network of APs, wherein the LAP is also assigned a unique MAC address. A non-beamforming (non-BF) mobile device (i.e., a device that is not currently engaged in beamformed communications) may be mobile or roaming within the coverage area of the AP network and may request a beamform (BF) connection from the AP network. Assuming the non-BF mobile device started a video streaming session, the LAP may create a BFSG and a MDSG profile for the mobile device. However, the system may determine that the mobile device is not associated with the LAP to receive the connection with the BFSG. One reason is that the mobile device may not be associated with the LAP due to having a MAC address that is different from the LAP MAC address. Therefore, the LAP may be configured to transmit data corresponding to changing the MAC address of the mobile device so the mobile device may re-associate with the LAP to receive the BFSG connection.

As noted above, the system may be configured such that where all the APs have unique MAC (or other) addresses, but a logical AP (LAP) is formed among the APs. Timing synchronization may be executed within the LAP to ensure that the data being transmitted from the LAP (through one or more PAPs) to the mobile device arrives at substantially the same time. Frequency synchronization may also be executed within the LAP.

The system may be configured where all APs and the LAP use their own unique MAC (or other) addresses, but the LAP may adopt the MAC address of one of the APs. In one example, the individual APs in the network of APs may all be assigned the same MAC address for purposes of communicating to the mobile device. Further, the LAP may be assigned the same MAC address as the MAC address of the APs in the network of APs. For example, all APs may have or be assigned unique MAC addresses for certain communications, but the LAP may adopt the MAC address of the AP from which the mobile device requested a beamformed connection. In this manner communications to the mobile device may come from different APs (or from the logical AP) but may share a source MAC (or other) address identifier.

The system and method for communicating to a mobile device via a plurality of APs may include managing the connection to the mobile device 110 to determine how the APs are chosen to provide the data to the mobile device. The LAP may also be configured to create the BFSG and the MDSG profiles for the mobile device and begin the process of beamforming to the mobile device or transmitting data to the mobile device using more than one AP. The serving AP MAC may relinquish data flow management to LAP MAC entities. The LAP may inform all AP controls or MACs in the BFSG/MDSG to begin managing the traffic/control related to the mobile device. The LAP control may also transmit data to all the APs in the network of APs in the MDSG of the mobile device's MAC address. The mobile device may detect a beamformed signal carrying data corresponding to the mobile device's MAC address. This detection of the beamformed signal may occur while the mobile device is still associated with the LAP or the individual AP. The mobile device may be agnostic about whether it is being served by the initial AP or by the LAP.

The LAP may be configured to delete the BFSG and the MDSG profiles for the mobile device and the mobile device will suddenly see a drastically different downlink performance, but still be unaware that it is now only being served by a single AP. If the mobile device is within the coverage area of the initial AP, the mobile device may receive data from the AP with the corresponding MAC address that the mobile device is still associated with. In this case, the mobile device may continue to receive data from the AP, but the data will no longer be transmitted over a beamformed connection.

In another configuration option, when the LAP control determines that members of the BFSG and/or MDSG should be added or deleted, the LAP may transmit data corresponding to the new AP member's control and address information. For example, for a new AP added to the BFSG, an initial BF weight, instructions to enable content caching for the mobile device, SDU counter of the first MAC packet to be transmitted and beamformed to the mobile device. For a new AP in the MDSG, the mobile device's MAC address may be provided. In the case of deleting an AP from the BFSG, the SDU counter of the MAC packet transmission should stop. Further, the LAP may relinquish MAC data control to the AP MAC if the AP is the original or initial serving AP to the mobile device. For deleting an AP from a MDSG, the SDU counter of the last MAC packet may be send to the LAP MAC for diversity combining.

Figure 7:
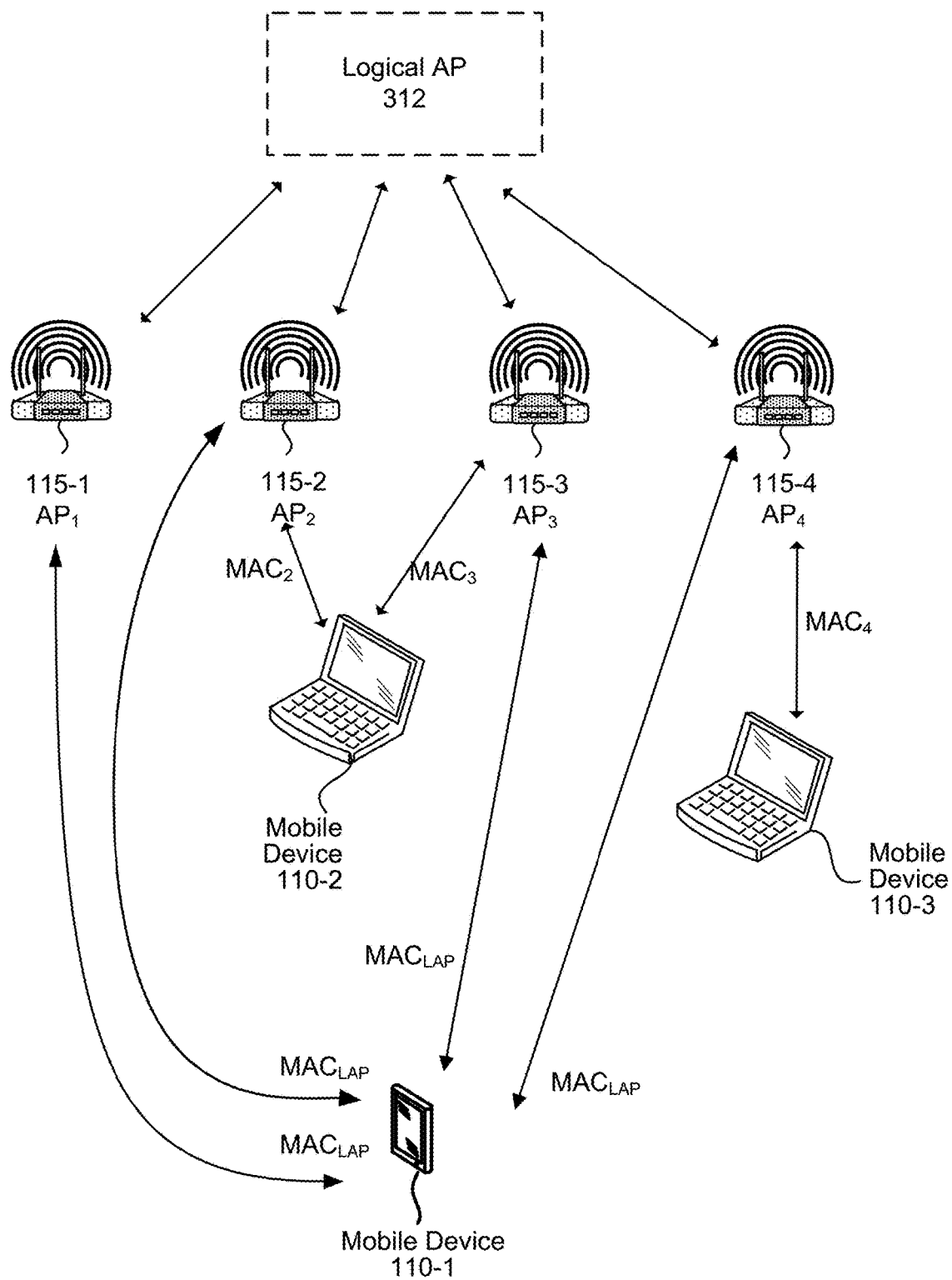
FIG. 7 is an illustration of a system for communicating to a mobile device using at least two of a plurality of access points, according to embodiments of the present disclosure.

FIG. 7 illustrates a system 700 for communicating with a mobile device 110-1, wherein the communication occurs via at least two of a plurality of access points. In this example embodiment, the system may execute multiple configuration operations to build or commission the wireless AP network and to establish the relationships between the physical APs in the network. The configuration options may include an option where all the APs have unique MAC addresses. Another option may include an option where all the APs have unique MAC addresses, but a logical AP (LAP) 312 is formed among the APs (APs 1-4,). The LAP 312 may have or be assigned a MAC address that is used to identify the LAP 312 in executing communications with other devices external to the LAP. For example, communications between the AP network and the mobile device 110 may be sent using the LAP MAC address (i.e., $MAC_{LAP}$) as the designated source address. Thus, as shown each of the PAPs in the AP network (APs 1-4, 115-1 through 115-4) may send messages to the mobile device 110-1 where the messages include $MAC_{LAP}$ as the source indicator. Further, any of the PAPs in the AP network (APs 1-4, 115-1 through 115-4) may receive and process messages from the mobile device 110-1 where the destination is indicated by the destination address corresponding to $MAC_{LAP}$, as they are all in the AP network. (The example of FIG. 7 assumes the BFSG is the same as the MDSG.) Other communications from the particular PAPs to other devices may use MAC IDs corresponding to the specific PAPs rather than the logical AP 312. For example, communications from $AP_2$ 115-2 to mobile device 110-2 may use $MAC_2$, communications from $AP_3$ 115-3 to mobile device 110-2 may use $MAC_3$, communications from $AP_4$ 115-4 to mobile device 110-3 may use $MAC_4$, and so on.

Another configuration option may be a configuration where all APs and the LAP use the same MAC address. In this example configuration option, all APs and LAP use the same MAC address. By assigning all APs and the LAP with the same MAC address, the system benefits from reducing the complexity of managing different MAC addresses across the network. This configuration essentially blends all APs into a logical AP (LAP). When mobile device 110 is powered on, it may only see the LAP with all underlying APs broadcasting the same SSID and using the same MAC address. The beacon traffic can be reduced as all APs can transmit the beacon at the same time. Timing and frequency synchronization must be achieved across the nodes in the network in order to satisfy the requirements for this configuration.

The AP functionality may be further reduced as the LAP may take control of the authentication and any and all control related decisions for the mobile device 110. The system may realize a potential violation of the CP length if two APs are too far in distance, which creates a "pseudo" multipath that extend beyond the length of the CP. However, that signal strength of the paths coming from the APs in far distances may not cause the OFDM receiver to break down.

When mobile device 110 enters the network coverage area and requests access to the network, the mobile device may try to associate with the LAP. Multiple APs may receive the packet from the mobile device, but none of the APs can make a decision because the information must be routed to LAP. The LAP may receive duplicates of the same packet from the APs. The LAP may be able to decide during the first encounter to BF to the mobile device. However, only non-BF responses can be created during network association, after which the LAP may determine which AP shall be the initial contact point with the mobile device. The downlink MAC packet may be sent from the LAP to the selected AP, then sent over the air without BF to the mobile device to complete the network association.

The system may also create a BFSG/MDSG, such as described above. One differences is that the LAP may determine how much decision power it will delegate to a physical AP to manage the non-BF mobile devices. Beamforming to a mobile device can be done in equivalence to this configuration option, wherein the LAP delegates non-BF mobile devices to APs or, alternatively, the LAP may control all mobile devices. In the latter case, MAC layers can be integrated between non-BF mobile devices and BF mobile devices.

The system may perform BFSG/MDSG deletion, for example because the APs carry the same MAC ID. For mobile devices returning to non-BF state, the LAP can select the AP having the strongest path as the serving or anchor AP for the non-BF mobile device (e.g., a mobile device that no longer needs an enhanced connection).

An example of managing the BFSG is how to select the APs to form the beam towards the mobile device. One metric is to select the BFSG and the corresponding BF weights that maximizes the signal-plus-interference-to-noise ratio (SINR), signal-to-noise ratio (SNR), or other signal quality metric. However, additional options may be described that provides the improved stability over time.

For example, the LAP controller may determine that multiple sets of BFSGs can provide good performance to the mobile device. However, the best (in the sense of SINR) BFSG involves APs that may be less common to other two sets of BFSGs. The LAP may be able to select the BFSG that has good SINR performance but has more overlapping APs with other possible BFSGs. Therefore, if the selected BFSG loses one AP, it can add other APs into the BFSG while maintaining other connections unchanged. This technique can reduce the need to cache content at new BFSG member APs.

Although a number of the above illustrations use WiFi as an example communication protocol that can be used to implement the techniques described herein, the system and method are not limited to WiFi and may implemented with a number of communication protocols including Time Division Multiple Access (TDMA) protocols, Code Division Multiple Access (CSMA) protocols, or other protocols.

Figure 8:
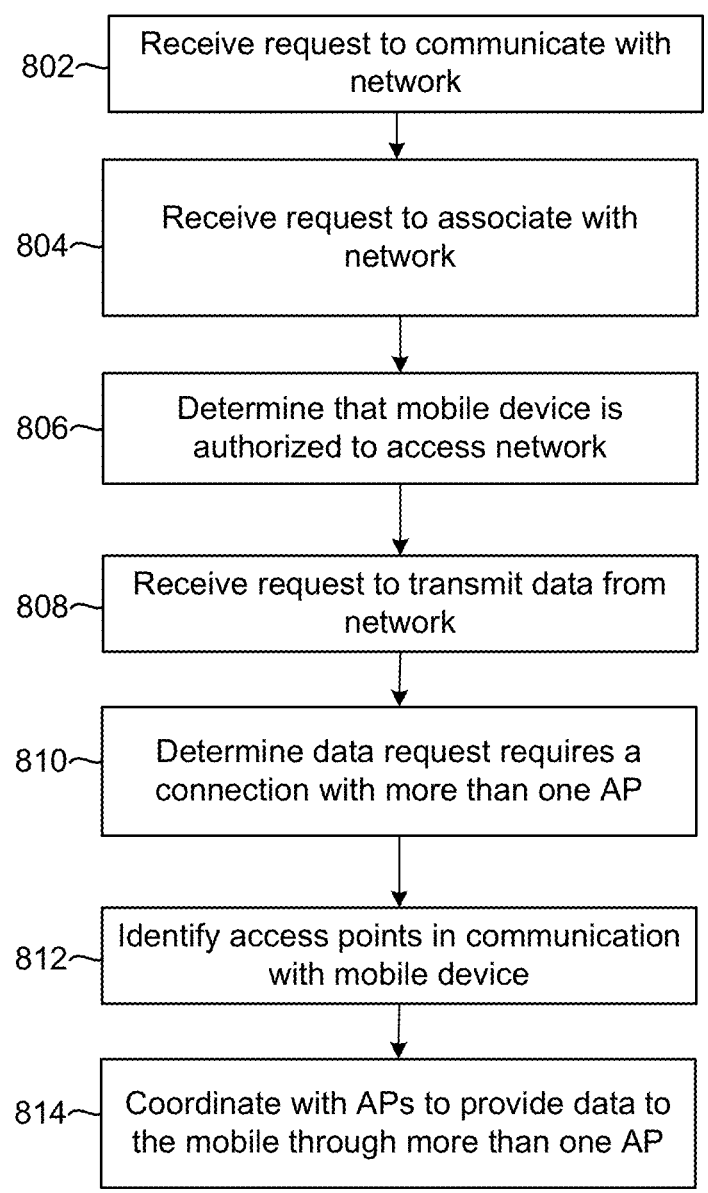
FIG. 8 is a diagram of a method for communicating with a mobile device via a plurality of access points.

FIG. 8 illustrates a method for communicating using an enhanced connection of the type described above. A system through an AP (or other component) may receive (802) a request to communicate with a network from a mobile device. The system may then receive (804) a request to associate with the network from the mobile device. The system may determine (806) that the mobile device is authorized to access the network. The system may then receive (808) a request to transmit data to the mobile device from the network. The system may then determine (810) that the request requires a connection with more than one AP. The system may identify (812) one or more APs that can communicate with the mobile device. The system may then coordinate (814) among the APs to provide the data to the mobile device using multiple APs.

Figure 9:
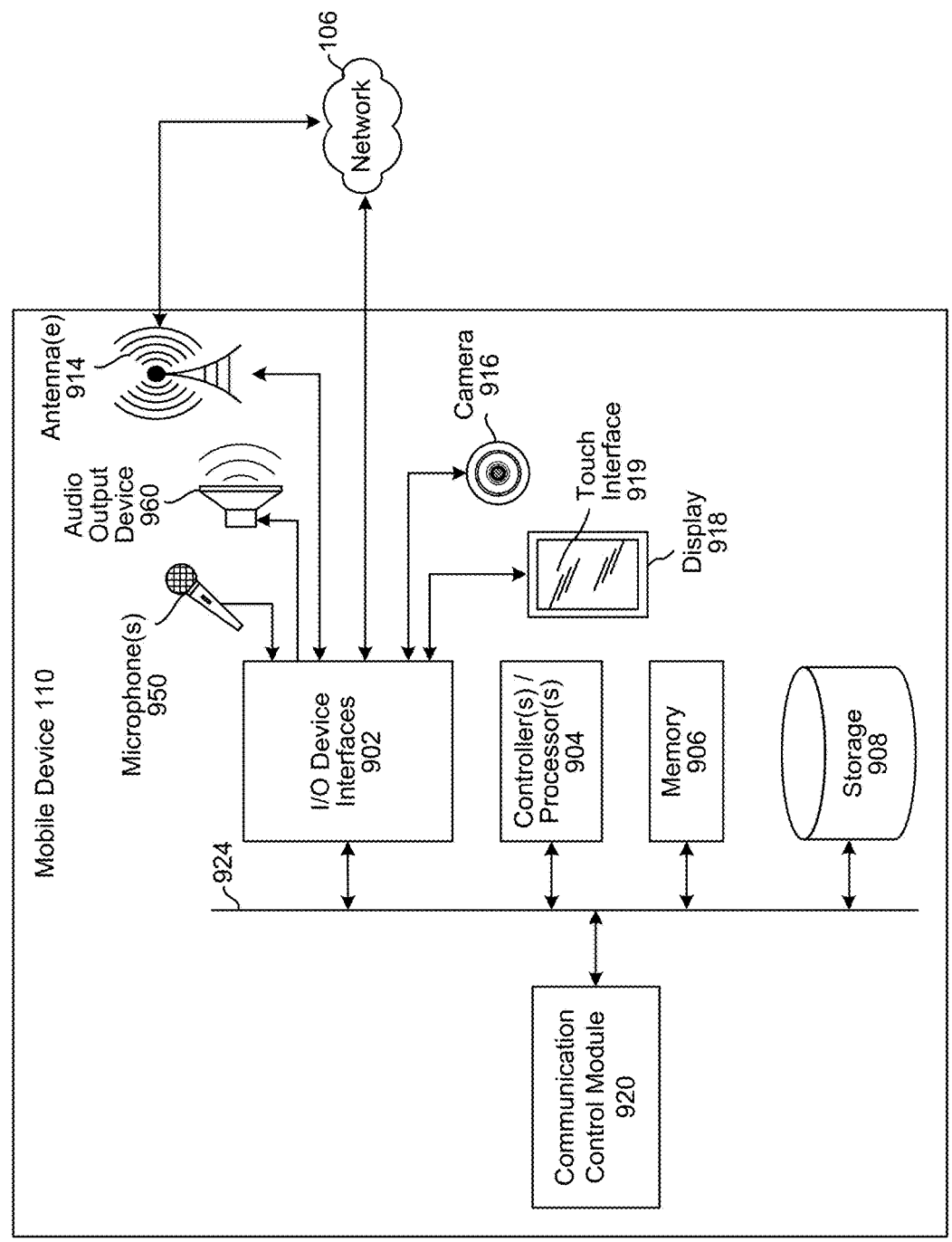
FIG. 9 illustrates components of a mobile device for communicating with a plurality of access points, according to an embodiment of the present disclosure.
Figure 10:
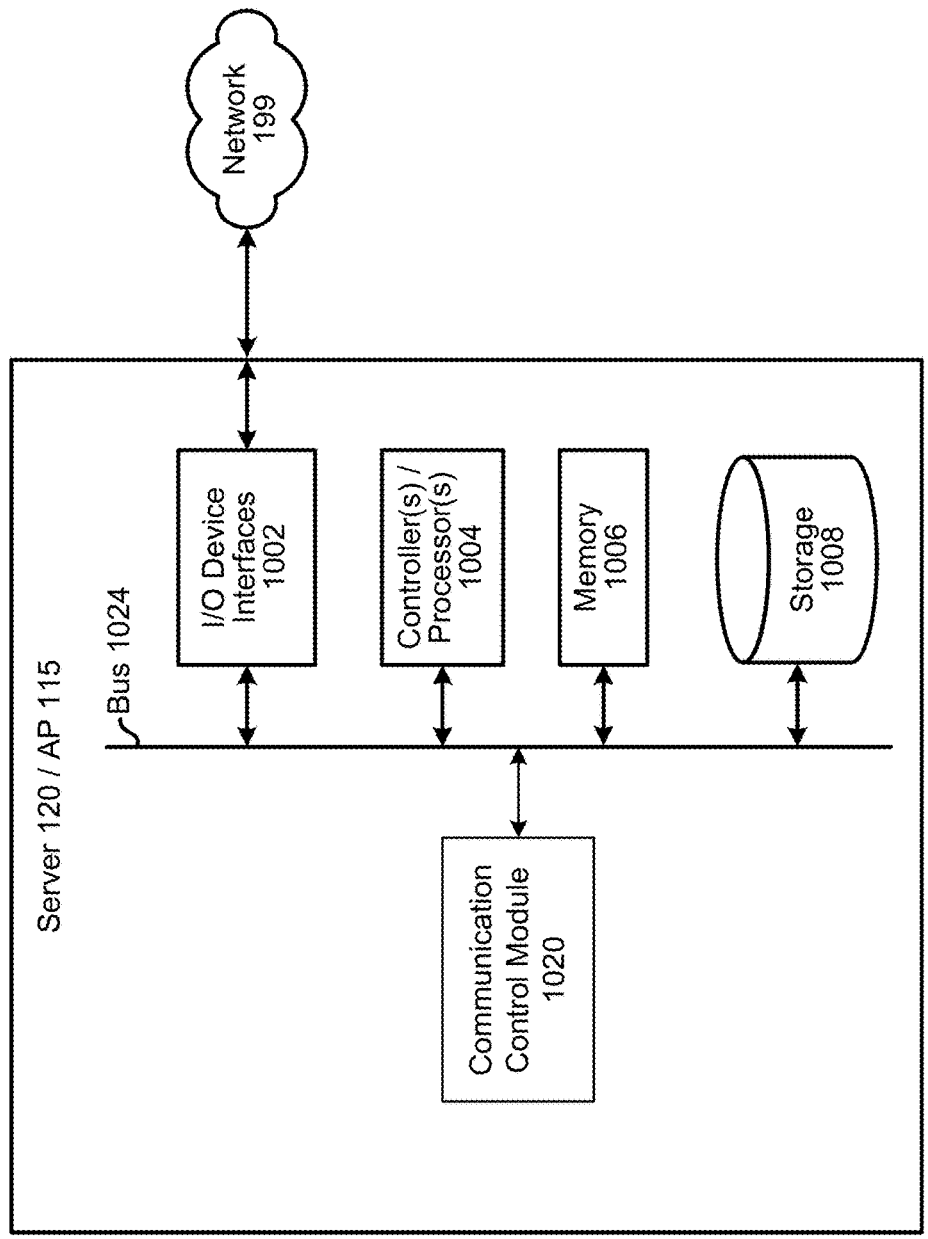
FIG. 10 illustrates components of a server or access point for communicating with a mobile device and/or other access points, according to an embodiment of the present disclosure.

FIG. 9 is a block diagram conceptually illustrating components of a mobile device 110 that may be used with the described system. FIG. 10 is a block diagram conceptually illustrating example components of a device such as the server 120 or AP 115 that may assist with communicating with the mobile device 110 as described above. Multiple servers 120 or APs 115 may be included in the system. In operation, each of these devices (or groups of devices) may include computer-readable and computer-executable instructions that reside on the respective device (110/115/120), as will be discussed further below.

Each of these devices (110/115/120) may include one or more controllers/processors (904/1004), that may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive (MRAM) and/or other types of memory. Each device (110/115/120) may also include a data storage component (908/1008), for storing data and controller/processor-executable instructions. Each data storage component may individually include one or more non-volatile storage types such as magnetic storage, optical storage, solid-state storage, etc. Each device (110/115/120) may also be connected to removable or external non-volatile memory and/or storage (such as a removable memory card, memory key drive, networked storage, etc.) through respective input/output device interfaces (902/1002).

Computer instructions for operating each device (110/115/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/115/120) includes input/output device interfaces (902/1002). A variety of components may be connected through the input/output device interfaces (902/1002). Additionally, each device (110/115/120) may include an address/data bus (924/1024) for conveying data among components of the respective device. Each component within a device (110/115/120) may also be directly connected to other components in addition to (or instead of) being connected to other components across the bus (924/1024).

Referring to the device 110 of FIG. 9, the device 110 may include input/output device interfaces 902 that connect to a variety of components such as an audio output component such as a speaker 960, a wired headset or a wireless headset (not illustrated), or other component capable of outputting audio. The device 110 may also include an audio capture component. The audio capture component may be, for example, a microphone 950.

The input/output device interfaces 902 may connect to one or more networks via a wireless local area network (WLAN) (such as WiFi), radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s), the system may be distributed across a networked environment. The local device may also include other components such as a camera 916, display 918, touch interface 919, or other components.

The mobile device 110 may include a communications control module 920, which may be a software, hardware, firmware, or other module configured to control the mobile device 110 to operate as described above. The server(s) 120 and/or AP(s) 115 may include a communications control module 1020, which may be a software, hardware, firmware, or other module configured to control the server(s) 120 and/or AP(s) 115 to operate as described above, for example in coordinating communications between multiple APs and a mobile device.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A method for establishing a connection between multiple access points to a mobile device, comprising:
    communicating over a first wireless connection between a first access point (AP) and a mobile device, wherein:
        the first AP has a first coverage area,
        the first wireless connection has a first data communication rate, and
        the first AP uses a first media access control (MAC) address for the first wireless connection;
    receiving a message from the mobile device requesting a wireless connection having a higher data communication rate than the first data communication rate;
    identifying a second AP having a second coverage area overlapping with the first coverage area;
    determining that the second AP is capable of communicating with the first AP;
    sending an instruction to the mobile device to communicate using a second wireless connection associated with a second MAC address, the second wireless connection having a second data communication rate greater than the first data communication rate;
    sending, to the mobile device from the first AP using the second connection and the second MAC address, first content data; and
    sending, to the mobile device from the second AP using the second connection and the second MAC address, the first content data.

2. The method of claim 1, further comprising:
    estimating a first travel time for a message from the first AP to the mobile device;
    estimating a second travel time for a message from the second AP to the mobile device;
    determining a difference between the first travel time and the second travel time;
    sending the first content data from the AP to the mobile device at a first time; and
    sending the first content data from the AP to the mobile device at a second time, wherein the second time is offset form the first time by the difference.

3. A method comprising:
    communicating, by a first access point (AP), with a mobile device using a first data communication rate;
    receiving, by the first AP, a request from the mobile device to communicate using a requested data communication rate that is higher than the first data communication rate;
    determining, by the first AP, that the mobile device is within communication range of a second AP;
    determining, by the first AP, that the second AP is capable of communicating with the first AP;
    determining, by the first AP, a second data communication rate between the mobile device and the second AP;
    determining, by the first AP, that the requested data communication rate is greater than the second data communication rate;
    sending, by the first AP to the mobile device, a first message including a first source address corresponding to a source of the first message; and
    causing, by the first AP, a second message to be sent from the second AP to the mobile device, the second message including the first source address.

4. The method of claim 3, wherein the communicating comprises communicating over a WiFi communication link and the first source address is a media access control (MAC) address.

5. The method of claim 4, further comprising receiving, by the first AP, the MAC address from a network controller.

6. The method of claim 3, further comprising, prior to determining the second AP:
    receiving a request from the mobile device for downlink data; and
    determining that the request requires throughput beyond a capability of the first AP.

7. The method of claim 3, wherein:
    sending the first message further comprises sending first payload data from the first AP to the mobile device as part of the first message; and
    causing the second message to be sent further comprises causing the first payload data to be sent from the second AP to the mobile device as part of the second message.

8. The method of claim 7, wherein the first message is sent at a first time and the method further comprises:
    sending an instruction from the first AP to the second AP, wherein the instruction comprises a command for the second AP to send the second message at a second time so that the first message and the second message arrive at the mobile device at substantially the same time.

9. The method of claim 3, wherein:
    sending the first message further comprises sending first payload data from the first AP to the mobile device as part of the first message; and
    causing the second message to be sent further comprises causing second payload data to be sent from the second AP to the mobile device as part of the second message, wherein the first payload data and second payload data correspond to a same media item.

10. The method of claim 9, wherein the first message is sent at a first time and the method further comprises:
    sending an instruction from the first AP to the second AP, wherein the instruction comprises a command for the second AP to send the second message at a second time so that the first message arrives at the mobile device at a time prior to the second message.

11. A system comprising:
    at least one processor;
    a memory including instructions operable to be executed by the at least one processor to configure the system to:
        communicate, by a first access point (AP), with a mobile device AP using a first data communication rate;
        receive, by the first AP, a request from the mobile device to communicate using a requested data communication rate that is higher than the first data communication rate;
        determine, by the first AP, that the mobile device is within a communication range of a second AP;
        determine, by the first AP, that the second AP is capable of communicating with the first AP;

determine, by the first AP, a second data communication rate between the mobile device and the second AP;

determine, by the first AP, that the requested data communication rate is greater than the second data communication rate;

send, by the first AP to the mobile device, a first message including a first source address corresponding to a source of the first message; and cause, by the first AP, a second message to be sent from the second AP to the mobile device, the second message including the first source address.

12. The system of claim 11, the memory further comprising instructions that further configure the system to:

communicate over a wireless communication link and wherein the first source address is a media access control (MAC) address.

13. The system of claim 11, the memory further comprising instructions that further configure the system to:

receive, by the first AP, the MAC address from a network controller.

14. The system of claim 11, the memory further comprising instructions that further configure the system to:

prior to determining the second AP:

receive a request from the mobile device for downlink data; and determine that the request requires throughput beyond a capability of the first AP.

15. The system of claim 11, the memory further comprising instructions that further configure the system to:

send the first message that includes instructions that cause the system to send first payload data from the first AP to the mobile device as part of the first message; and send the second message that includes instructions that cause the first payload data to be sent from the second AP to the mobile device as part of the second message.

16. The system of claim 15, wherein the first message is sent at a first time and wherein the instructions when executed further cause the system to, send an instruction from the first AP to the second AP, wherein the instruction comprises a command for the second AP to send the second message at a second time so that the first message and the second message arrive at the mobile device at substantially the same time.

17. The system of claim 11, the memory further comprising instructions that further configure the system to:

send the first message which further cause the system to send first payload data from the first AP to the mobile device as part of the first message; and send the second message which further cause second payload data to be sent from the second AP to the mobile device as part of the second message, wherein the first payload data and second payload data correspond to a same media item.

18. The system of claim 17, wherein the first message is sent at a first time and the instructions when executed further cause the system to:

send an instruction from the first AP to the second AP, wherein the instruction comprises a command for the second AP to send the second message at a second time so that the first message arrives at the mobile device at a time prior to the second message.

* * * * *